US009269111B2

(12) United States Patent
Herring

(10) Patent No.: US 9,269,111 B2
(45) Date of Patent: Feb. 23, 2016

(54) METHODS, SYSTEMS, AND COMPUTER READABLE MEDIA FOR DETERMINING SOCIAL COMPATIBILITY USING A SELECTED GROUP

(71) Applicant: Shandon Wesley Herring, Durham, NC (US)

(72) Inventor: Shandon Wesley Herring, Durham, NC (US)

( * ) Notice: Subject to any disclaimer, the term of this patent is extended or adjusted under 35 U.S.C. 154(b) by 281 days.

(21) Appl. No.: 13/792,350

(22) Filed: Mar. 11, 2013

(65) Prior Publication Data

US 2014/0214872 A1    Jul. 31, 2014

Related U.S. Application Data

(60) Provisional application No. 61/758,331, filed on Jan. 30, 2013.

(51) Int. Cl.
*G06F 17/30* (2006.01)
*G06Q 50/00* (2012.01)
*G06Q 10/10* (2012.01)
*G06Q 30/06* (2012.01)

(52) U.S. Cl.
CPC ............ *G06Q 50/01* (2013.01); *G06Q 10/10* (2013.01); *G06Q 30/0611* (2013.01)

(58) Field of Classification Search
None
See application file for complete search history.

(56) References Cited

U.S. PATENT DOCUMENTS

2011/0145050 A1*  6/2011  Gross et al. ............... 705/14.25
2014/0043426 A1*  2/2014  Bicanic et al. ............ 348/14.02

* cited by examiner

*Primary Examiner* — Anh Tai Tran
(74) *Attorney, Agent, or Firm* — Shandon W. Herring

(57) ABSTRACT

Methods, systems, and computer readable media for determining social compatibility using a selected group are disclosed. According to one method, the method occurs at a computing platform. The method includes receiving, via a communications interface, interaction information about a first person. The interaction information is associated with at least one member of a selected group. The method also includes determining, using the interaction information, whether the first person is compatible with a second person.

20 Claims, 3 Drawing Sheets

| MEMBER | POI | PROFILE VERACITY | INTERACTION LEVEL | LOOKS | PERSONALITY | NOTES | COMPATIBLE WITH TIMOTHY? |
|---|---|---|---|---|---|---|---|
| FRED | KIM | TRUE | DATED – 2 MONTHS | 8 | 4 | | YES |
| ERIN | KIM | TRUE | FRIEND | 7 | 7 | | YES |
| JAMES | KIM | TRUE | DATED – 2 WEEKS | 7 | 6 | | NO |
| KEN | KIM | TRUE | 3 DATES | 6 | 8 | | |
| BOB | KIM | | EMAIL | 9 | | | YES |
| BOB | JOY | | 5 DATES | 4 | 4 | | NO |
| KEN | JOY | FALSE | 2 DATES | 2 | 1 | | NO |
| | JOY | | | | | WEARS A WIG | |

METHODS, SYSTEMS, AND COMPUTER READABLE MEDIA FOR DETERMINING SOCIAL COMPATIBILITY USING A SELECTED GROUP

PRIORITY CLAIM

This application claims the benefit of U.S. Provisional Patent Application Ser. No. 61/758,331, filed Jan. 30, 2013; the disclosure of which is incorporated herein by reference in its entirety.

TECHNICAL FIELD

The subject matter described herein relates to social networks. More specifically, the subject matter relates to methods, systems, and computer readable media for determining social compatibility using a selected group.

BACKGROUND

Online dating has grown immensely over the past two decades. In particular, dating websites have expanded from searchable text profiles to include many aspects of modern social networks, including instant messages, video chats, and/or other interactions between users. While profiles and digital interactions help members of dating websites to discover more about each other, it is still possible for some members to be tricked or "catfished" by other members. As such, members of these dating websites often feel that in-person meetings or dates are the only ways to determine whether people are who they appear to be and whether chemistry or compatibility exists between the parties.

Generally, after varying amounts of communications, two members of a dating website will arrange a meeting. Generally, the meetings are natural progressions for exploring a potential relationship. While going on dates can be a very effectively way to gauge chemistry, the cost and time involved may inhibit the number of dates a person goes on. Many times members of dating sites can make poor decisions on which users to meet. For example, since online interactions and/or profiles are limited indicators of a true in-person meeting, incompatible people may appear as compatible. As a result, in-person meetings with incompatible people may waste precious dating resources. By culling out incompatible people from a pool of potential companions prior to an in-person meeting, cost and time associated with dating can be minimized.

Accordingly, a need exists for improved methods, systems, and computer readable media for determining social compatibility using a selected group.

SUMMARY

Methods, systems, and computer readable media for determining social compatibility using a selected group are disclosed. According to one method, the method occurs at a computing platform. The method includes receiving, via a communications interface, interaction information about a first person. The interaction information is associated with at least one member of a selected group. The method also includes determining, using the interaction information, whether the first person is compatible with a second person.

A system for determining social compatibility using a selected group is also disclosed. The system includes a communications interface configured to receive, via a communications interface, interaction information about a first person. The interaction information is associated with at least one member of a selected group. The system also includes a compatibility module configured to determine, using the interaction information, whether the first person is compatible with a second person.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, each of the terms "function" and "module" refer to hardware, firmware, or software in combination with hardware and/or firmware for implementing features described herein. In some embodiments, a module may include a hardware-based circuit, a field-programmable gateway array (FPGA), an application-specific integrated circuit (ASIC), or software executed by a processor.

BRIEF DESCRIPTION OF THE DRAWINGS

The subject matter described herein will now be explained with reference to the accompanying drawings of which:

FIG. 2 is a diagram illustrating exemplary data for determining social compatibility using a selected group according to an embodiment of the subject matter described herein.

DETAILED DESCRIPTION

The subject matter described herein discloses methods, systems, and computer readable media for determining social compatibility using a selected group. In accordance with aspects of the subject matter described herein, a group may be selected or otherwise assembled. The selected group may include one or more persons. For example, a group of friends may decide to share dating information for one or more online dating websites or other social networks. One or more computing platforms (e.g., a server, a blade, a network node, a distributed computing system, or a server farm) may receive interaction information about numerous users of one or more social networking sites (e.g., Match.com® and Facebook®) from one or more members of the selected group. The one or more computing platforms may use this information in determining whether two people are socially compatible (e.g., for a romantic relationship, a platonic relationship, or a friendship).

Figure 1:
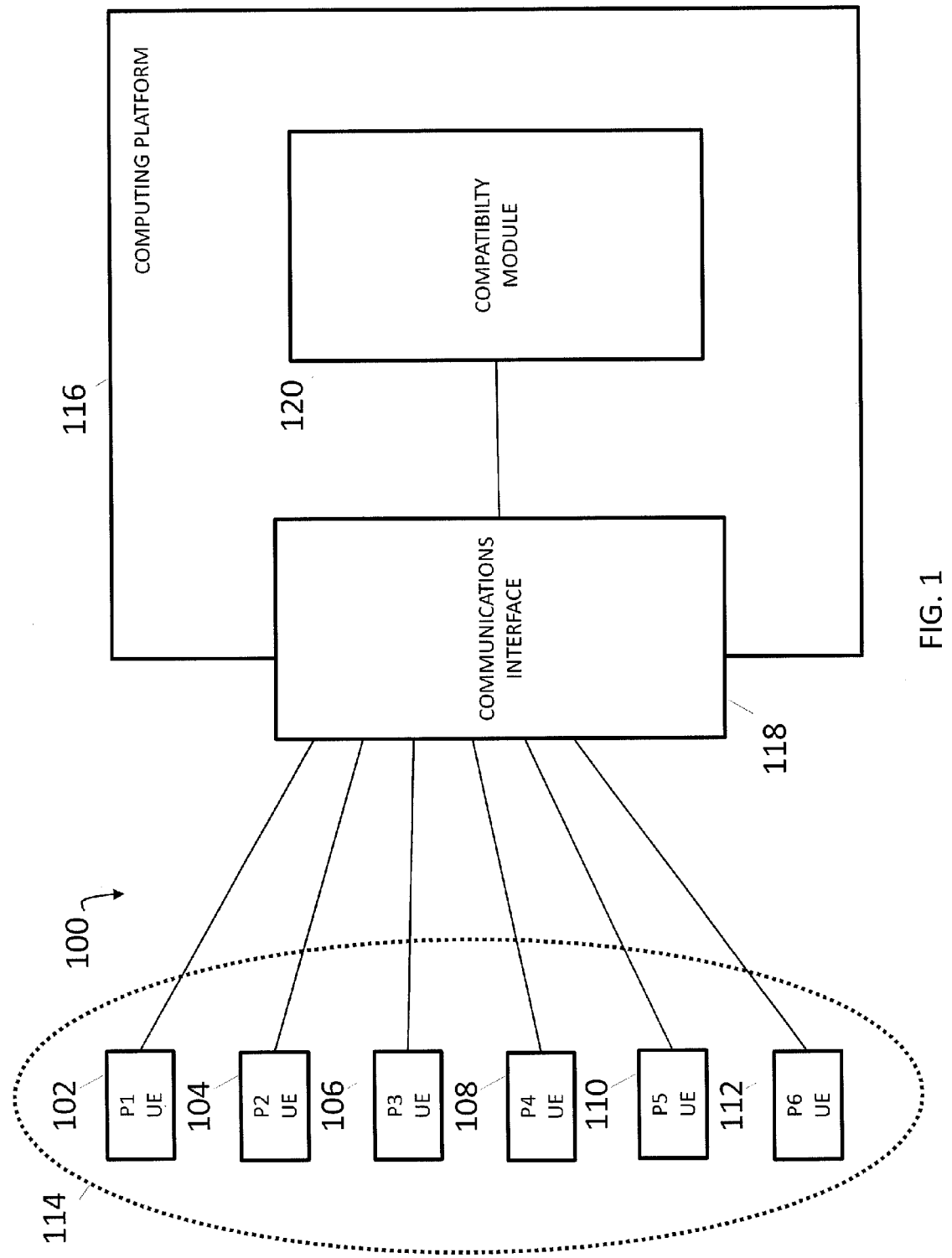
FIG. 1 is a diagram illustrating an exemplary network for determining social compatibility using a selected group according to an embodiment of the subject matter described herein.

FIG. 1 is a diagram illustrating an exemplary network 100 for determining social compatibility using a selected group according to an embodiment of the subject matter described herein. Network 100 may include multiple networks, such as the Internet and mobile or wireless network. Network 100 may include multiple user equipment or devices (UEs) 102-112 and a computing platform 116. UEs 102-112 may be suitable entities for allowing a user (e.g., of a social network) to communicate with computing platform 116 or other entities in network 100. Exemplary UEs may include a smart phone, a computing tablet, a personal computer, or a mobile device.

UEs 102-112 may be associated with a group 114. Group 114 may include one or more persons (e.g., users of social networks or websites). In some embodiments, group 114 may be based on or determined by a common interest, a physical location, an occupation, a race, a gender, a sexual orientation, a religion, an ethnicity, an education level, an age group, a goal, a common dislike, a person, an entity, a computing platform, a module, a corporate sponsor, and/or a company. For example, a group of friends may join a social network. One of the friends may create group 114 and may invite the other friends to join group 114. In another example, a grouping module may be utilized to place related people into group 114. In this example, the grouping module may give potential members a chance to opt out of the related group and/or give the potential members a chance to join one or more alternative groups. In yet another example, people may select or request to join group 114. In this example, group 114 may be public (e.g., open to anyone) or a group administrator or group leader may accept or reject requests from potential members.

In some embodiments, each member of group 114 may share information with all members of group 114 or a subset of group 114. For example, each member may be part of one or more dating websites. The members may share information about other users of these websites, such as people they dated or met in-person, with other members.

In some embodiments, members of group 114 may agree to group-related settings and/or compatibility settings. Exemplary group-related settings may include information that is shared, information that is shared but anonymized (e.g., modifying information to remove user-identifying information), information that is not shared, whether new members can be added by a group administrator or whether a new member must be voted on, whether members can contact other members directly, voting rules for selecting new members, whether settings can be changed by a group administrator or whether settings must be voted on, voting rules for changing settings, or other settings that affect group behavior.

Computing platform 116 may be any suitable entity (e.g., a stand-alone node or distributed multi-node system) configured to perform one or more aspects associated with communicating with UEs 102-112 and/or determining social compatibility. In some embodiments, computing platform 116 may be a server (e.g., a web server), a network node, a computing device, or software executing on a processor. In some embodiments, computing platform 116 may be a single node or may be distributed across multiple computing platforms or nodes.

Computing platform 116 may include or access memory or storage for storing various information. For example, group-related information, e.g., group-related settings, information shared between members of group 114, and/or credentials for accessing one or more social networks and/or websites. Exemplary storage may include any non-transitory computer readable medium or physical memory device.

In some embodiments, computing platform 116 may be configured to retrieve information from one or more social networks and/or websites. For example, computer platform 116, or a module therein, may be configured to log in to a website using stored credentials associated with a group member. After logging in, emails, profiles, and/or other interaction information may be analyzed and gleaned for information about other users of the dating website. This information may be retrieved and shared with members of group 114. For example, screen names, real names, ages, education levels, and/or locations of non-members of group 114 that are currently interacting with a given member of group 114 may be retrieved and shared. In this example, computer platform 116, or a module therein, may request additional information about the users from the given member. Exemplary additional information about the users may include an interaction level, a profile truthfulness or veracity rating, a personality rating, an attractiveness rating, additional notes, and/or a compatibility recommendation.

In some embodiments, computer platform 116 may receive information from group members directly or indirectly. For example, instead of logging in to a website using stored credentials, a group member may enter information about users of various social networks and/or dating websites manually. In this example, computer platform 116, or a module therein, may not store credentials for logging in to various social networks and/or websites.

Computing platform 116 may include a communications interface 118 and a compatibility module 120. Communications interface 118 may be any suitable entity (e.g., a network interface card (NIC)) for receiving information from or sending information to UE 102-112 and/or other entities in network 100. For example, communications interface 118 may receive or send Internet protocol messages, hypertext transfer protocol (HTTP) messages, extensible markup language (XML) messages, authentication messages, and/or other protocol-based messages or packets. In some embodiments, communications interface 118 may be implemented using a processor, memory, and/or other hardware.

Compatibility module 120 may be any suitable entity (e.g., an ASIC, a FPGA, or software executing on a processor) for receiving data, transmitting data, and/or processing data. Compatibility module 120 may be configured to determine whether two people are compatible. In some embodiments, compatibility module 120 or another module may select, identify, and/or assembly group 114. For example, compatibility module 120 may include a grouping module for grouping related people into group 114. In this example, the grouping module may give potential members a chance to opt out of the related group and/or give the potential members a chance to join one or more alternative groups. In another example, compatibility module 120 may provide a user interface to allow people to assembly or create their own group 114. In this example, compatibility module 120 may send invites to potential members from a group administrator and/or join requests from potential members to a group administrator.

In some embodiments, group 114 may be determined by at least one of a common interest, a physical location, an occupation, a race, a gender, a sexual orientation, a religion, an ethnicity, an education level, an age group, a goal, a common dislike, a person, a group of people, a computing platform, a module, a corporate sponsor, a company, or a third person.

In some embodiments, a person may be dynamically grouped depending on a particular person of interest. For example, a person 'Y' may have a "black book" of interaction information for various persons. In this example, person 'Y' may be interested in person 'X'. Compatibility module 120 may, dynamically or by request, group person 'Y' with other persons 'A'-'R' that have interaction information about person 'X'. In some embodiments, grouping between person 'Y' and persons 'A'-'R' may provide data as anonymous sources. In some embodiments, grouping between person 'Y' and persons 'A'-'R' may only occur if arrangement is mutually beneficial, e.g., person 'Y' has interaction information about someone of interest for each of persons 'A'-'R' or person 'Y' agrees to share their "black book" of interaction information, or a portion thereof, with persons 'A'-'R'.

In some embodiments, compatibility module 120 may be configured to analyze at least a portion of the interaction information using a compatibility determination algorithm. For example, a compatibility determination algorithm may use a formula that quantifies one or more factors associated with the interaction information. The compatibility determination algorithm may determine whether the first person is compatible with a second person based on the one or more quantified factors.

An exemplary formula for a compatibility determination algorithm may use attractiveness ratings and personality ratings from group members who went on at least 3 dates with a person. In this example, each attractiveness rating (e.g., a value from 1-10) may be multiplied by 0.7 (70% weight) and each personality rating (e.g., a value from 1-10) may be multiplied by 0.3 (30% weight). The weighted values are totaled and divided by the number of reviewers to get a final score.

In some embodiments, the final score or one or more weighted values may be adjusted based on one or more group member's reliability rating. For example, if interaction information about a person of interest is received from two group members, and one member has reliability rating of 50% and the other member has a reliability rating of 100%. The ratings from the member having a reliability rating of 100% may be weighted higher than the ratings from the member having a reliability rating of 50%.

Another exemplary formula may add or subtract value from a preliminary score or a final score based on the inclusion or exclusion of certain fasctors factors, e.g., keywords found in additional notes or other information provided by group members or indication that a person's profile is inaccurately. For example, 0.5 points may be deducted from a person's final score if negative keywords, such as "insane" or "creeper", are associated with the person. In another example, 0.5 points may be added to a person's final score if positive keywords, such as "flexible", "rich", or "owns a beach house", are associated with the person.

In some embodiments, members of group 114 may select a compatibility threshold for indicating compatibility. Compatibility module 120, or compatibility determination module, may use this threshold in determining whether a person is compatible. For example, member 'A' may select a final score of '7.0' as indicative of a compatible match and member 'B' may select a final score of '6.5' as indicative of a compatible match.

In some embodiments, a portion of a compatibility determination algorithm, a formula, or one or more factors associated with the formula may be preconfigured or determined dynamically (e.g., on-the-fly), may be configured or determined by a person, a group of people, or an entity (e.g., a module or node). For example, compatibility-related settings, such as factors to use when determining compatibility, compatibility keywords, and weights associated with the factors may be voted on or determined by members of group 114. In this example, after joining group 114, a member may view or adjust some settings, such as a compatibility threshold, that may be different from other members of group 114. In another example, compatibility-related settings may be determined by each member of group 114 independently. In this example, after joining group 114, a member may view or adjust various compatibility settings using available information that is or will being be provided by group members.

In some embodiments, some members may provide varying amounts of data for various people. As such, some compatibility determinations for certain people may be based on more information than other compatibility determinations. In some embodiments, compatibility module 120 may be configured to require certain data be provided prior to sharing or making the information available to other members of group 114. The mandatory data may include a user identifier, an interaction level and/or other information.

In some embodiments, compatibility module 120 may be configured to determine that two people are compatible by determining that no member of the selected group has dated the first person. For example, some members of group 114 avoid dating people that other members of group 114 have dated or are currently dating. In this example, these members may use a compatibility determination algorithm that disqualifies or returns a zero final score for any person that has dated another member of group 114.

In some embodiments, compatibility module 120 may be configured to determine that two people are compatible by determining at least one member of the selected group has dated the first person and indicates that the first person is compatible with the second person. For example, some members of group 114 may only date people that have been vetted, e.g., people that other members of group 114 have dated. In this example, these members may use a compatibility determination algorithm that disqualifies or returns a zero final score for any person that has no interaction with any member of group 114.

In some embodiments, compatibility module 120 may be configured to anonymize at least some information about group 114, a member of group 114, the interaction information, the first person, or the second person. For example, if a member of group 114 discovers a potentially embarrassing or scandalous detail about a person, such as the person has webbed feet, the person is not the sex they claim in their profile, or the person has a sexually transmitted disease. The name of the member may be hidden or disassociated from the information and the detail may appear as coming from an anonymous member. In some embodiments, to prevent nefarious or improper uses, the embarrassing or scandalous detail may need to be independently verified (e.g., a second member may provide the same embarrassing or scandalous detail) or otherwise be approved before being shared with group 114.

In some embodiments, compatibility module 120 may be configured to inform one or more persons or entities about compatibility in response to determining that the first person is compatible with the second person. For example, compatibility module 120 may inform one or more persons or entities by sending a message, an email, a text message, a voice mail, or another form of notification.

It will also be appreciated that the above described components are for illustrative purposes and that features or portions of features described herein may be performed by different and/or additional modules, components, or nodes.

FIG. 2 is a diagram illustrating exemplary data 200 for determining social compatibility using a selected group according to an embodiment of the subject matter described herein. Exemplary data 200 represents any suitable information that may be used in determining compatibility between people. In some embodiments, exemplary data 200 may be stored in memory at or accessible by computing platform 116 or compatibility module 120.

Exemplary data 200 may include information about a member of group 114 who is providing information about a person of interest (POI), the POI, a profile veracity indicator, an interaction level, a looks or attractiveness rating, a personality ratings, additional information or notes, and/or a compatibility recommendation for one or more member.

In FIG. 2, the column identified as "MEMBER" may represent any identifier for identifying a member of group 114. The column identified as "POI" may represent any identifier for identifying a person of interest that is being reported on, e.g., a user of a dating website that a member of group 114 dated. Exemplary member or POI identifiers may include screen names or real names. The column identified as "PROFILE VERACITY" may represent an indicator (e.g., a Boolean value) for indicating whether a profile associated with the POI is accurate or truthful. The column identified as "LOOKS" may represent a ratings indicator or value (e.g., a number between 1-10, a picture, or a color) for indicating physical attractiveness of a POI. The column identified as "PERSONALITY" may represent a ratings indicator or value (e.g., a number between 1-10, a picture, or a color) for indicating non-physical (e.g., emotional, physiological, attitudinal, and/or behavioral) attractiveness of a POI. The column identified as "NOTES" may represent any other information for describing the POI or for determining compatibility. The column identified as "COMPATIBILITY WITH TIMOTHY" may represent an indicator (e.g., a Boolean value) for indicating whether a group member believes the POI is compatibility with a particular person.

It will also be appreciated that the above described data or columns are for illustrative purposes and that additional and/or different data may be used in determining compatibility between people. For example, compatibility recommendations regarding every member of group 114 may be maintained for each POI. In another example, each group member may have a reliability rating such that other group members may rate the truthfulness or accuracy of the group member's information about a given POI or group of POIs.

Figure 3:
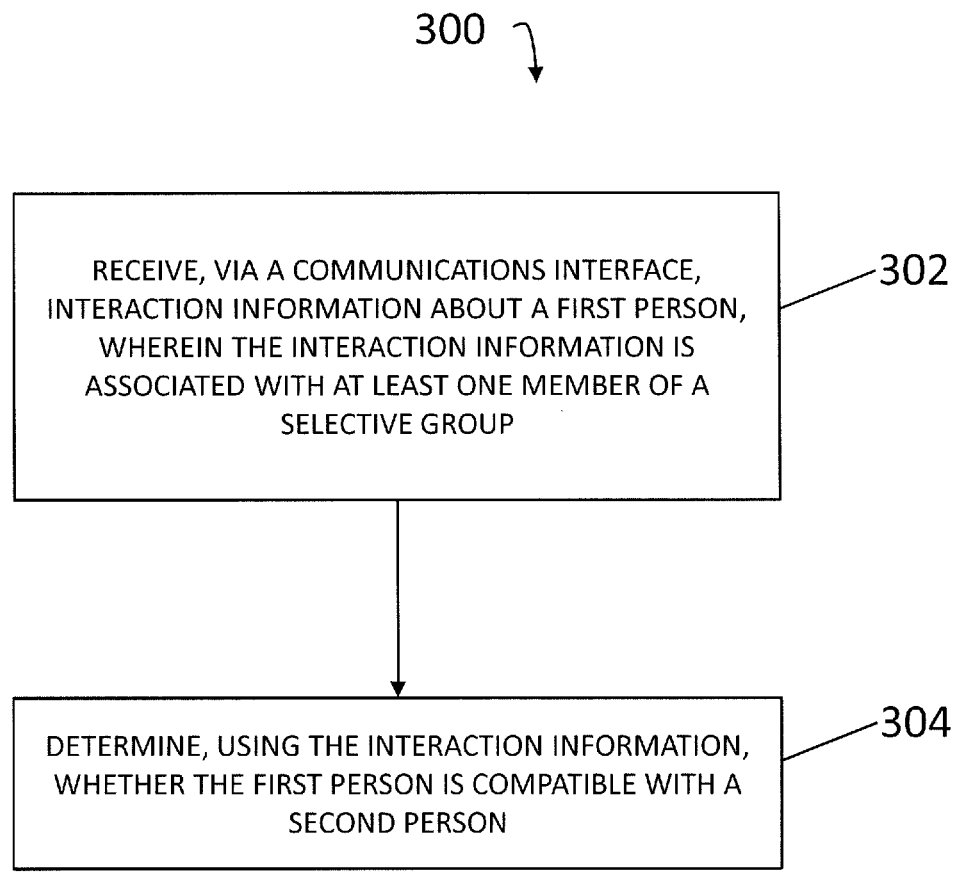
FIG. 3 is a diagram illustrating an exemplary process for determining social compatibility using a selected group according to an embodiment of the subject matter described herein.

FIG. 3 is a diagram illustrating an exemplary process for determining social compatibility using a selected group according to an embodiment of the subject matter described herein. In some embodiments, exemplary process 300, or portions thereof, may be performed by or at computing platform 116, communication interface 118, compatibility module 120, a processor, and/or another node or module.

At step 302, interaction information about a first person may be received via a communications interface. The interaction information may be associated with at least one member of group 114. For example, the interaction information may be received directly or indirectly from the at least one member.

In some embodiments, receiving interaction information may include receiving the interaction information from a second computing platform, a network node, a server, the at least one member, or a third entity.

In some embodiments, interaction information may include information indicting no interaction between the at least one member and the first person, information about interaction between the at least one member and the first person, information about someone who knows or has information about the first person, dating information associated with the first person, information about physical characteristics of the first person, information about mental characteristics of the first person, information about behavioral characteristics of the first person, or information about social characteristics of the first person.

In some embodiments, group 114 may be determined by at least one of a common interest, a physical location, an occupation, a race, a gender, a sexual orientation, a religion, an ethnicity, an education level, an age group, a goal, a common dislike, the first person, the second person, or a third entity.

In some embodiments, a third entity may include a computing platform, a module, a corporate sponsor, a company, or a third person.

In some embodiments, one or more members of group 114 may be self-selected for group 114. For example, a member may request a group administrator to be in group 114.

At step 304, it may be determined, using the interaction information, whether the first person may be compatible with a second person.

In some embodiments, determining whether a first person is compatible with a second person may include analyzing at least a portion of the interaction information using a compatibility determination algorithm.

In some embodiments, a compatibility determination algorithm may use a formula that quantifies one or more factors associated with the interaction information and determines whether the first person is compatible with a second person based on the one or more quantified factors.

In some embodiments, a portion of the compatibility determination algorithm, the formula, or the one or more factors may be preconfigured or determined dynamically by group 114, the first person, the second person, or a third entity.

In some embodiments, at least some information about group 114, a member of group 114, the interaction information, the first person, or the second person may be anonymized.

In some embodiments, the receiving or the determining may be implemented using at least one of a processor and a memory.

In some embodiments, in response to determining that the first person may be compatible with the second person, informing the first person, the second person, or a third entity.

In some embodiments, informing the first person, the second person, or the third entity may include sending a message, an email, a text message, a voice mail, or a notification to the first person, the second person, or the third entity.

In some embodiments, determining that the first person may be compatible with the second person may include determining that no member of group 114 has dated the first person.

In some embodiments, determining that the first person may be compatible with the second person may include determining that the at least one member of group 114 has dated the first person and indicates that the first person may be compatible with the second person.

In some embodiments, the second person may be a member of group 114.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for sharing information among members of a group, the method comprising:

at a computing platform comprising at least one processor and a memory:
  storing, in the memory, user credentials associated with members of a group for sharing user information from at least two dating sites or social networks;
  obtaining, using at least one of the user credentials, user information about at least one member of the group from the at least two dating sites or social networks, wherein the user information indicates that the at least one member of the group and a first person have interacted;
  determining, using the user information of the at least one member of the group and group settings indicating what information is sharable among the members, that at least one other member of the group is to receive information about the first person;
  requesting, from the at least one member of the group that has interacted with the first person, interaction information about the first person not available from the at least two dating sites or social networks;
  receiving the interaction information about the first person; and
  sharing the interaction information with the at least one other member of the group.

2. The method of claim 1 comprising:
in response to determining that the first person is compatible with a second person, informing the first person, the second person, or a third entity.

3. The method of claim 1 wherein receiving the interaction information includes receiving the interaction information from a second computing platform, a network node, a server, the at least one member, or a third entity.

4. The method of claim 1 wherein the group is determined by at least one of a common interest, a physical location, an occupation, a race, a gender, a sexual orientation, a religion, an ethnicity, an education level, an age group, a goal, a common dislike, the first person, the second person, or a third entity.

5. The method of claim 1 comprising determining, using the interaction information, whether the first person is compatible with a second person includes analyzing at least a portion of the interaction information using a compatibility determination algorithm that quantifies one or more factors associated with the interaction information and determines whether the first person is compatible with a second person based on the one or more quantified factors.

6. The method of claim 5 wherein a portion of the compatibility determination algorithm, the formula, or the one or more factors are preconfigured or determined dynamically by the group, the first person, the second person, or a third entity.

7. The method of claim 1 wherein the interaction information includes information indicting no interaction between a second member of the group and the first person, information about interaction between the at least one member and the first person, information about someone who knows or has information about the first person, dating information associated with the first person, information about physical characteristics of the first person, information about mental characteristics of the first person, information about behavioral characteristics of the first person, or information about social characteristics of the first person.

8. The method of claim 2 wherein determining that the first person is compatible with the second person includes determining that no member of the group has dated the first person or determining that the at least one member of the group has dated the first person and indicates that the first person is compatible with the second person.

9. The method of claim 1 wherein at least some information about the group, a member of the group, the interaction information, the first person, or the second person is anonymized.

10. The method of claim 2 wherein informing the first person, the second person, or the third entity includes sending a message, an email, a text message, a voice mail, or a notification to the first person, the second person, or the third entity.

11. A system for sharing information among members of a group, the system comprising:
  a computing platform comprising:
    at least one processor;
    a memory; and
    a compatibility module implemented using the memory and the at least one processor, wherein the compatibility module is configured to store, in the memory, user credentials associated with members of a group for sharing user information from at least two dating sites or social networks, to obtain, using at least one of the user credentials, user information about at least one member of the group from the at least two dating sites or social networks, wherein the user information indicates that the at least one member of the group and a first person have interacted, to determine, using the user information of the at least one member of the group and group settings indicating what information is sharable among the members, that at least one other member of the group is to receive information about the first person, to request, from the at least one member of the group that has interacted with the first person, interaction information about the first person not available from the at least two dating sites or social networks; to receive the interaction information about the first person, and to sharing the interaction information with the at least one other member of the group.

12. The system of claim 11 wherein the compatibility module is configured to receive interaction information from a second computing platform, a network node, a server, the at least one member, or a third entity.

13. The system of claim 11 wherein the compatibility module is configured to inform the first person, a second person, or a third entity in response to determining that the first person is compatible with the second person.

14. The system of claim 11 wherein the group is determined by at least one of a common interest, a physical location, an occupation, a race, a gender, a sexual orientation, a religion, an ethnicity, an education level, an age group, a goal, a common dislike, the first person, the second person, or a third entity.

15. The system of claim 11 wherein the compatibility module is configured to analyze at least a portion of the interaction information using a compatibility determination algorithm that quantifies one or more factors associated with the interaction information and determines whether the first person is compatible with a second person based on the one or more quantified factors.

16. The system of claim 15 wherein a portion of the compatibility determination algorithm, the formula, or the one or more factors are preconfigured or determined dynamically by the group, the first person, the second person, or a third entity.

17. The system of claim 11 wherein the interaction information includes information indicting no interaction between a second member of the croup and the first person, information about interaction between the at least one member and the first person, information about someone who knows or has information about the first person, dating information associated with the first person, information about physical characteristics of the first person, information about mental characteristics of the first person, information about behavioral characteristics of the first person, or information about social characteristics of the first person.

18. The system of claim 12 wherein the compatibility module is configured to determine that the first person is compatible with the second person by determining that no member of the group has dated the first person or by determining that the at least one member of the group has dated the first person and indicates that the first person is compatible with the second person.

19. The system of claim 11 wherein the compatibility module is configured to anonymize at least some information about the group, a member of the group, the interaction information, the first person, or the second person.

20. A non-transitory computer readable medium comprising computer executable instructions embodied in a computer readable medium that when executed by a processor of a computer control the computer to perform steps comprising:

storing, user credentials associated with members of a group for sharing user information from at least two dating sites or social networks;

obtaining, using at least one of the user credentials, user information about at least one member of the group from the at least two dating sites or social networks, wherein the user information indicates that the at least one member of the group and a first person have interacted;

determining, using the user information of the at least one member of the group and group settings indicating what information is sharable among the members, that at least one other member of the group is to receive information about the first person;

requesting, from the at least one member of the group that has interacted with the first person, interaction information about the first person not available from the at least two dating sites or social networks;

receiving the interaction information about the first person; and sharing the interaction information with the at least one other member of the group.

* * * * *